UNITED STATES PATENT OFFICE.

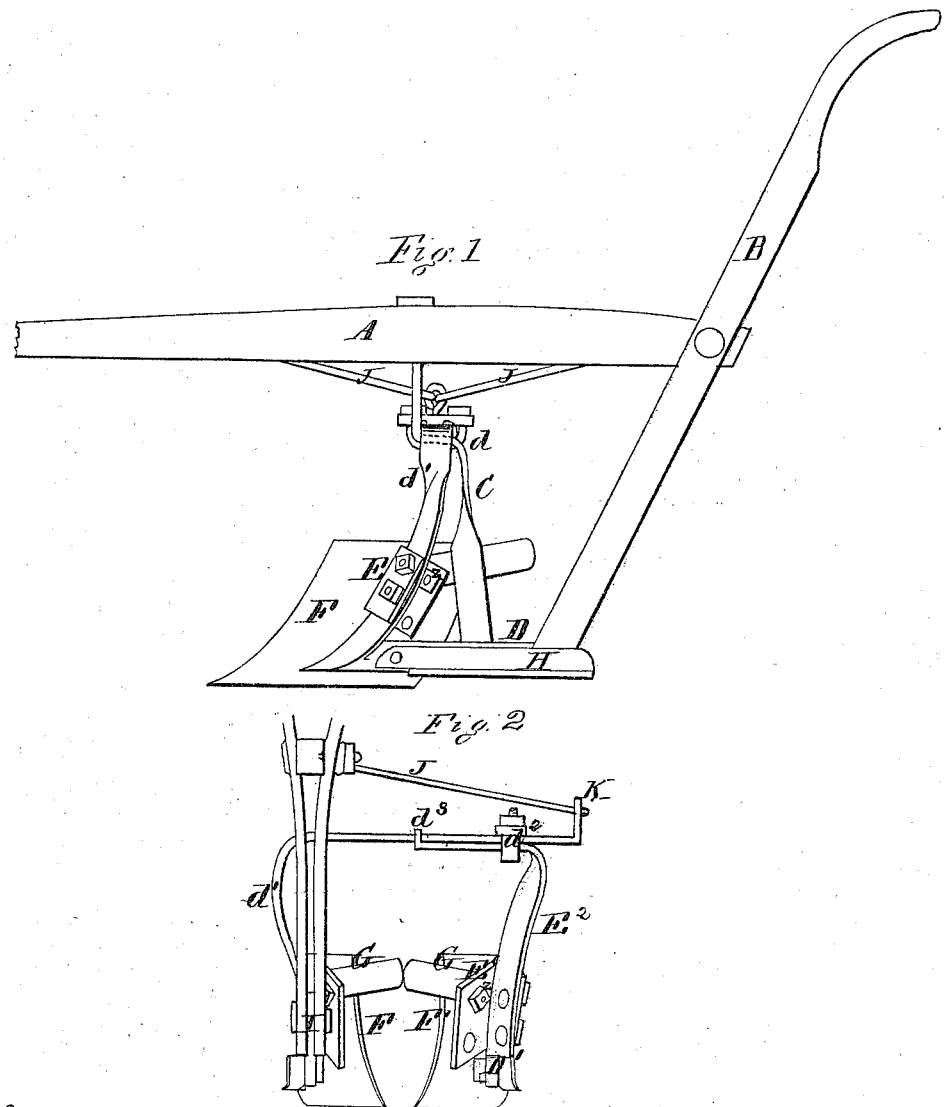

NOAH BELL AND HENRY WINFIELD, OF PANTEGO TOWNSHIP, BEAUFORT COUNTY, NORTH CAROLINA.

IMPROVEMENT IN COTTON-CULTIVATORS.

Specification forming part of Letters Patent No. 134,632, dated January 7, 1873.

*To all whom it may concern:*

Be it known that we, NOAH BELL and HENRY WINFIELD, of Pantego township, in the county of Beaufort and State of North Carolina, have invented a new and valuable Improvement in Cotton-Cultivators and Scrapers; and we do hereby declare that the following is a full, clear, and exact description of the construction and operation of the same, reference being had to the annexed drawing making a part of this specification, and to the letters and figures of reference marked thereon.

Figure 1 of the drawing is a representation of a side view of our invention; Fig. 2 is a rear view of our invention; and Fig. 3 is a view of shovel-plow.

Our invention has relation to cotton-cultivators; and it consists in the construction and novel arrangement of devices for regulating the height of the ridges and smoothing the earth of devices for clearing out the channels between the rows, and the means whereby the shovels are capable of being adjusted to any desirable distance apart, all as hereinafter described.

Referring to the drawing, A designates the draft-beam, and B the handles. C is the bent and twisted standard secured to the beam A and to the land-side D, and provided with an offset, $d$, upon which rests a bent and twisted bar, $d^1$, which is welded to the land-side D, as shown, and has secured to it an L-shaped saddle, E, to which is bolted the shovel F by means of two bolts, one passing through a slot in the shovel F and the other constituting a pivot to allow the shovel to be adjusted and its point raised. The shovel F' is similarly attached to a saddle, E$^1$, which is secured to a bent bar, E$^2$, the horizontal part of which passes under the horizontal part of the bar $d^1$ and through a clip, $d^2$, and has lugs $d^3$ on its end bent up and over the sides of the bar $d^1$, as shown. The bar E$^2$ is capable of being moved along through or with the clip, so that the shovels may be arranged at different distances apart. The bar E$^2$ is welded to the land-side D'. The shovels are arranged obliquely, diverging at the points, and pass on either side of the hill. To the backs of the shovels are pivoted by bolts $z$ the adjustable plates G, which project backward and converge at their rear ends. The object of said plates is to scrape off the superfluous earth from the hills and give the latter the proper form. A slight inward twist is given to each plate at the end to enable it to press the earth forward and prevent it from falling over their sides. These plates lie between the backs of the shovels and the saddle, and are secured by the bolts $z$, which pass through the slots in the shovels. H designates flanged clearers attached to the forward portions of the land-sides D D' and diverging therefrom at their rear ends. These clearers are designed to pass between the rows and clear the ground of weeds, &c. I represents a standard, bent on the rear end of the land-side D. To the sides of this standard the handles B are secured by a transverse bolt. J designates oblique braces supporting the bar $d^1$ at one end. These braces are attached to the beam A and to a lug, K, bent on the end of the bar $d^1$, as shown.

What we claim as our invention, and desire to secure by Letters Patent, is—

1. The construction and arrangement of the bars C $d^1$ E$^2$, land-sides D D', and clip $d^2$, substantially as specified.

2. The diverging flanged clearers H secured to the land-sides D D' at their forward ends, in combination with the oblique shovels F F', substantially as specified.

3. The slotted, pivoted, and obliquely-arranged shovels F F', saddles E E$^1$, and bent standards $d^1$ E$^2$, combined and arranged substantially as specified.

In testimony that we claim the above we have hereunto subscribed our names in the presence of two witnesses.

NOAH BELL.
HENRY WINFIELD.

Witnesses:
JOHN R. WINFIELD,
GEORGE W. RIDDICK.